Patented Dec. 22, 1936

2,064,950

UNITED STATES PATENT OFFICE 2,064,950

RESINOUS CONDENSATION PRODUCT AND METHOD OF PRODUCING SAME

Israel Rosenblum, Jackson Heights, N. Y.

No Drawing. Application August 11, 1934, Serial No. 739,474

11 Claims. (Cl. 106—22)

My invention relates to synthetic resins and has for its object to produce resinous condensation products of great complexity and extraordinarily high molecular weight with the aid of a polybasic inorganic acid or its anhydride.

It is also an object of the present invention to produce synthetic resins of ready solubility in the common solvents, such as mineral spirits, toluol, ethyl acetate, varnish oils, etc., and of substantially neutral reaction, good consistency and body, which are compatible with nitrocellulose and other cellulosic lacquers and may be used in conjunction therewith, and also with a great variety of natural and synthetic gums used in the lacquer and varnish industry.

It is well known that polyhydric alcohols, such as glycerol, may be either completely or partially esterified with monobasic or polybasic acids to produce esters which, in certain cases, are of resinous character or can be condensed or polymerized into resinous or approximately resinous substances by more or less prolonged heating at elevated temperatures. The reactions occurring during the formation of many of the synthetic resinous products are not thoroughly understood, but it is probable that during the first stages of the reaction a part of the polyhydric alcohol is under certain conditions only partially esterified (especially when an excess of the alcohol is present), and that during the subsequent heating the free hydroxyl groups of two or more molecules condense and become united through an oxygen bond to form a more complex molecule.

According to the present invention, a plurality of molecules of a polyhydric alcohol partially esterified with a high molecular weight fatty acid obtained from fatty oils and from fats, and a polybasic aliphatic acid, such as maleic, succinic, malic and tartaric acids (which molecules may or may not themselves be of resinous character) are united or condensed with the aid of an inorganic polybasic acid or its anhydride, preferably boric acid, which directly forms the bond between such molecules. In this way, a plurality of large organic molecules may be condensed by an inorganic acid of relatively low molecular weight, so that a very complex product may be obtained with the use of a comparatively small quantity of inorganic acid. The relative quantities of reacting materials and the other conditions are so regulated that the complex substances so produced contain one or more free hydroxyl groups which are then caused to combine with an acidic reaction product of a phenol, an aldehyde and an organic salt of zinc or other metal, and containing free rosin or other acidic natural resin such as described in my United States Patent No. 1,809,570. In this manner I obtain very complex resins having highly desirable properties and composed of a polyhydric alcohol, a monobasic fatty oil or fat acid, a polybasic aliphatic acid, a polybasic inorganic acid, and the reaction product of a penol, an aldehyde, and the organic salt of a metal.

Products of improved properties, such as better drying qualities, or greater solubility and flexibility may, in accordance with the present invention, be obtained by treating the boronized hydroxy-esters of the polybasic aliphatic acid and the high molecular weight fatty acid with suitable acids until the same are substantially neutral. Organic acids of various kinds may be employed, such as acetic, succinic, tartaric, benzoic, phthalic, etc., and also resin acids, either natural or synthetic. Excellent results are obtained by the use of the higher aliphatic acids, such as oleic, linoleic, linolenic, ricinoleic, stearic, palmitic, and other acids obtainable from drying and non-drying oils and from fats; and where I employ such oil and fat acids, I may cause the same to react with the polyhydric alcohol prior to the dibasic acid, as illustrated in the examples below. In general I prefer to employ rosin or other natural resin (which is, of course, acidic in nature) in conjunction with any of the acids just specified. Improved results are generally obtained if the natural resin, if used, is first cracked or dry-distilled, as by heating to a temperature of about 260° or above. I may also employ, either alone or together with linoleic or any of the other acids mentioned, a condensation product of phenol, formaldehyde, a natural resin, such as rosin, and an organic salt, such as a zinc soap, specifically zinc abietate, as described in my above-mentioned patent. The acidic compounds just enumerated will combine with the boronized hydroxy-esters of glycerol and the dibasic aliphatic acid and at least partially neutralize the same, thereby producing extremely complex esters of glycerol with the dibasic aliphatic acid, boric acid, and one or more of the other acidic organic bodies mentioned above.

The treatment of the boronized hydroxy-esters with the fatty acids mentioned above are described and, excepting the treatment with the phenol-formaldehyde condensation product, claimed in my copending application, Serial No. 438,901, filed March 25, 1930. The present application is in the nature of a division of such earlier filed case and is directed to the treatment of the boronized hydroxy-esters of a polybasic aliphatic acid and the high molecular weight fatty acid (or rosin) with a phenol-aldehyde condensate and to the products obtained thereby.

As indicated above, and as preferably carried out, the reaction between the partial ester of glycerol and the polybasic aliphatic acid and the boric acid is made to take place under such proportions and conditions that the resulting product contains free basic hydroxyl groups. As is well known, the reaction product of phenol and formaldehyde at an advanced, though still soluble, stage of condensation is usually of acidic nature, particularly if the condensation is made to take place in the presence of rosin or other natural resin. I have found that the hydroxy boronized condensate can be made to combine with the acidic phenolic condensate to produce a substantially neutral, highly complex resin having very valuable properties, particularly with regard to solubility, body, luster and compatibility with cellulosic and other lacquers and varnishes.

The reaction may be made to occur in steps, as by first treating the high molecular weight fatty acid with an excess of glycerol and then reacting the hydroxy-esters so produced with boric acid and the polybasic aliphatic acid and finally heating the boronized hydroxy-esters with the phenolic condensate until a substantially neutral product is obtained; or else all of the ingredients in proper proportions may be made to react simultaneously.

Instead of combining the condensate of boric acid and the partial ester or esters of glycerol and the polybasic aliphatic acid directly with the phenolic condensate, the free basic hydroxyls of these boronized esters may be combined with the acidic compounds obtained by condensing with an excess of boric acid the hydroxy-esters obtained by partially neutralizing glycerol with an acidic phenol-aldehyde-rosin condensate, preferably one formed in the presence of an organic salt catalyst. In this way, complex compounds are obtained in which what may be regarded as a nucleus composed of an ester of glycerol and polybasic aliphatic acid is joined through boron bonds to one or more other glycerol-polybasic aliphatic acid esters and to one or more glycerol esters of phenol-aldehyde-rosin condensates. As an example of the phenol condensates, I may mention the acidic reaction product of phenol, formaldehyde, rosin (or other natural resin), with an organic salt (preferably of a high molecular weight acid, such as abietic acid) of zinc or other metal, such as calcium, strontium, barium, magnesium, lead, etc. Instead of partially neutralizing glycerol with an acidic phenolic condensate, as stated above, I may partially neutralize it with such condensate together with any of the other organic acids listed hereinabove. In general, I prefer to use, in place of the rosin as it is commercially available, rosin which has been heated or cracked in the presence of an organic zinc (or other metal) salt-phenol-aldehyde condensate. By the use of such zinc-phenol-aldehyde condensate, the product is made more resistant, while at the same time the formation of compounds, which crystallize out from ethyl acetate solution and consequently are not colloidal or film-forming, is prevented. It will be understood that, in place of rosin, other resins, such as the fossil resins, may be employed which are similarly dry-distilled or cracked.

By the above procedure, extremely complex resins are obtained which are highly weather and waterproof, have excellent body and are compatible with cellulosic lacquers. My novel boronized condensates produce varnishes having a very glossy and lustrous surface. They also make excellent wood fillers.

Condensates of somewhat different properties may be obtained, according to my invention, by treating an excess of glycerol with boric acid and then reacting the hydroxy-esters so obtained with a synthetic resin of acidic nature, such as a phenol-formaldehyde resin, and preferably one produced in the presence of rosin and an organic salt of zinc or other metal, such as calcium, lead, tin or any of the other metals mentioned in my United States Patent No. 1,809,570. Instead of first boronizing the glycerol, all of the reacting compounds may be mixed together and heated. By the use of boric acid a resin of improved properties is obtained in which the condensation is more complete.

Several modes of carrying out my invention are described hereinbelow, but it will be understood that the examples are given by way of illustration only and are not to be construed in a limiting sense.

*Example 1.*—420 grams linoleic fatty acid and 138 grams of glycerol are heated at about 230° C. for about two hours, thereby forming the glycerol mono-ester. There are then added 31 grams of boric acid and the heating continued at about 200° C. for about two hours. At this point there are added 147 grams of maleic anhydride and the heating continued at about 160° C. for about two hours until a clear, uniform product of the desired viscosity is obtained. This product is soluble in common varnish solvents, such as coal tar solvents and mixtures of coal tar solvents with petroleum solvents. These solutions are compatible with other resins, oils and varnishes and can be used for clear coatings or as vehicles for enamels, etc. The resin may be reacted with a fusible, soluble, condensate of a phenol (such as phenol, cresol or their higher homologues), an aldehyde, rosin, and any suitable catalyst, glycerol being added to neutralize such condensate at about 200° C. if a large sum of rosin is present.

*Example 2.*—531 grams monolinoleic glycerine ester (prepared as in Example 1 or by any known method) and 31 grams boric acid are heated at about 200° C. for about two hours. There are then added 147 grams maleic anhydride, the heating continued for about an hour at 160° C., at which point there are added 60 grams glycerine and 200 grams of an acidic resinous complex prepared through condensation of a phenol, formaldehyde, rosin and a small quantity of an organic zinc salt or any of the other metal compound catalysts disclosed in my above-mentioned patent. The temperature is raised to about 200° C. and heating at that temperature is continued until a clear, uniform material is obtained, soluble in varnish solvents such as solvent naphtha, mineral spirits, etc. The properties and uses of this material are similar to those described in Example 1.

In place of the maleic acid employed in the examples, other dibasic aliphatic acids, such as succinic, tartaric, malic, etc., may be used; and in place of boric acid any other suitable polyhydric inorganic acid, such as telluric, phosphoric, arsenic, silicic acids, etc., or their anhydrides, may be employed. If desired, the reactions described hereinabove may be made to take place in the presence of a natural resin, preferably dry-distilled, which may act as a solvent, or may supply one of the reacting acids.

Variations may be resorted to within the scope of the appended claims without departing from the spirit of the invention.

The present application is a continuation in part of my copending applications, Serial No. 438,901, filed March 25, 1930, and Ser. No. 441,731, filed April 4, 1930, now Patent 1,969,761.

I claim:

1. The method of producing complex resinous condensation products which comprises heating glycerol, a drying oil acid, boric acid, maleic acid, and a condensate of a phenol, formaldehyde, rosin and a compound of the group consisting of basic inorganic compounds and organic salts of a metal of the second group of the periodic system, until a homogeneous resinous material is obtained.

2. The method of producing complex resinous condensation products which comprises heating glycerol, a quantity of a high molecular weight fatty acid sufficient to form the mono-ester of the alcohol, boric acid, a dicarboxylic aliphatic acid and a condensate of a phenol and an aldehyde until a homogeneous resinous material soluble in toluol is obtained.

3. The method which comprises reacting 1½ mols of glycerol, 1½ mols of linseed oil fatty acids, and ½ mol. of boric acid, and then reacting the resulting condensate with approximately 1½ mols of maleic anhydride, ⅔ mol. of glycerol and about 200 grams of an acidic resinous complex obtained by condensing a phenol, formaldehyde, rosin and a small quantity of an organic zinc salt until a clear uniform material is obtained.

4. A soluble resinous condensation product produced by reacting a polyhydric alcohol, a high molecular weight fatty acid, boric acid, a dicarboxylic aliphatic acid and a phenolaldehyde resin.

5. A soluble resinous condensation product of the hydroxyl-containing partial polyhydric alcohol ester of a high molecular weight fatty acid, boric acid, a dicarboxylic aliphatic acid, and a condensate of a phenol, an aldehyde and an acidic natural resin.

6. A soluble resinous condensation reaction product of a basic hydroxyl-containing partial glycerol ester of a drying oil acid, boric acid, maleic acid, and a condensate of a phenol and aldehyde and an acidic natural resin.

7. A soluble resinous condensation reaction product of a basic hydroxyl-containing partial glycerol ester of a drying oil acid, boric acid, maleic acid and a condensate of a phenol, formaldehyde, rosin and an organic zinc compound.

8. The method which comprises reacting the glycerol mono-ester of a drying oil acid, boric acid, a dicarboxylic aliphatic acid and a phenolaldehyde condensate.

9. The method which comprises reacting the partial glycerol ester of a drying oil acid with boric acid, a dicarboxylic aliphatic acid, and a condensate of a phenol, formaldehyde and rosin, the glycerol and acidic materials being employed in substantially equivalent proportions.

10. The method of producing complex resinous condensation products which comprises heating a polyhydric alcohol, a high molecular weight fatty acid, an inorganic acid of the group consisting of boric, telluric, phosphoric, arsenic and silicic acids, a dicarboxylic aliphatic acid, and a condensate of a phenol and an aldehyde until a homogeneous resinous material is obtained.

11. The method acording to claim 10, wherein the proportion of alcohol to acid material is such that a product having a low acid number is obtained.

ISRAEL ROSENBLUM.